United States Patent [19]

Katoh

[11] 4,055,727
[45] Oct. 25, 1977

[54] PARTIAL RESPONSE, QUADRATURE AMPLITUDE MODULATION SYSTEM

[75] Inventor: Tadayoshi Katoh, Kawasaki, Japan

[73] Assignee: Fujitsu Limited, Kawasaki, Japan

[21] Appl. No.: 716,098

[22] Filed: Aug. 20, 1976

[30] Foreign Application Priority Data

Aug. 20, 1975 Japan .............................. 50-100759

[51] Int. Cl.$^2$ ............................................. H04L 15/00
[52] U.S. Cl. ...................................... 178/68; 178/67; 325/38 A
[58] Field of Search ...................... 178/67, 68, 66 R; 325/30, 38 A, 39, 38 R

[56] References Cited

U.S. PATENT DOCUMENTS

| | | | |
|---|---|---|---|
| 3,679,977 | 7/1972 | Howson | 325/38 A |
| 3,806,807 | 4/1974 | Nakamura | 178/68 |
| 3,829,779 | 8/1974 | Fujimoto | 178/68 |
| 3,845,412 | 10/1974 | Rearwin | 178/67 |
| 3,849,595 | 11/1974 | Ishiguro | 178/68 |
| 3,947,767 | 3/1976 | Koike | 178/68 |

Primary Examiner—Robert L. Griffin
Assistant Examiner—Michael A. Masinick
Attorney, Agent, or Firm—Staas & Halsey

[57] ABSTRACT

A communication system combines partial response and quadrature amplitude modulation systems. Two parallel input signals supplied for transmission are processed by a differential logic circuit which produces two parallel output signals, in turn supplied to respective pre-coding circuits and subsequently to corresponding partial response converter circuits. Corresponding modulators receive the thus processed two parallel signals for amplitude modulation of respective quadrature-related carrier signals and for combining same for QAM transmission. The differential logic circuit examines the parallel input signals and, for a code combination thereof wherein the code combination would not be influenced by the 90° phase ambiguity of the regenerated carrier during demodulation in the receiver, the parallel input signals received thereby are applied directly to the pre-coding circuits; conversely, where the code combination of the parallel input signal code combination would be influenced by the 90° phase ambiguity of the regenerated carrier during the aforesaid demodulation, the two parallel input signals are processed in accordance with the differential logic processing prior to supply to the pre-coding circuit. Particularly, when the input signals $P_n$, $Q_n$ are (1,1) or (0,0), they are applied directly to the pre-coding circuit; when (0,1) the preceding transmitting vector position is maintained, and when (1,0), the differential logic changes the phase thereof by ±90° from the preceding transmitting vector position. The preceding transmitting vector is defined as that vector corresponding to the next preceding signal code combination (1,0) or (0,1), skipping any vector corresponding to a code combination (0,0) or (1,1) which may intervene. In the receiver, a corresponding differential logic circuit is provided, whereby the output data in the receiver is accurately reproduced in accordance with the originally transmitted data, independently of the phase ambiguity of the phase of the regenerated carrier in the receiver.

6 Claims, 14 Drawing Figures

PARTIAL RESPONSE, QUADRATURE AMPLITUDE MODULATION SYSTEM

BACKGROUND OF THE INVENTION

1. Field of the Invention

The present invention relates to partial response modulation systems and, more particularly, to a partial response modulation system employing quadrature amplitude modulation.

2. Description of the Prior Art

Data transmissions systems generally are designed to avoid the generation of intersymbol interference. However, some systems are known in which intersymbol interference is postively used, often referred to as controlled intersymbol interference. Namely, the impulse response of this system and thus the transmitted waveform by means of which successive symbols are transmitted is controlled such that there is a constant intersymbol interference in one or more bits. This technique of controlled intersymbol interference reduces the frequency spectrum of the impulse response, or waveform, and thus makes more efficient use of transmission bandwidth. Such a method of transmission is referred to as duobinary, and the implementation of this method typically as a partial response system. A partial response system as above mentioned is described in the papers: "Generalization of A Technique for Binary Data Communication" by E. R. Kretzner; IEEE Transactions on Communication Technology, April 1966, Volume COM-14, No. 1, pp 67-68, and "Data Transmission Using Controlled Intersymbol Interference" by K. H. Schmidt; Electrical Communication Volume 48, No. 1 and 2, 1973.

Partial response systems are classified into a total of five types, designated class 1 to class 5. Each of these types differs in the means of the superimposition of the impulse response; where the input signal is a 2-level signal, the superimposition results in a multi-level signal.

In class 1 partial response systems, an input pulse is converted into a pulse of a doubled width and accordingly preceding and succeeding pulses are superimposed. Thus, a 2-level digital input signal becomes a 3-level signal.

In such a partial response system, it is necessary to accumulate the preceding element (bit) group in order to demodulate the signal which was subjected to partial response conversion, thereby to return to the initial 2-level signal. Because of this, a problem arises in that erroneous propagation occurs during demodulation. Thus, symbol processing, called precoding, is performed before the partial response conversion. To amplify, for a 2-level digital signal having the levels "0" and "1" and converted in accordance with partial response conversion to the levels of "0", "1", and "2", for example, the code conversion is always performed so that the level "1" of the converted, partial response signal corresponds to the level "1" of the initial 2-level input digital signal.

Quadrature amplitude modulation systems as well are known in the prior art. In such systems, quadrature-related carriers, i.e., carriers of the same frequencies but having a phase difference therebetween of 90°, are independently amplitude modulated and then combined into a QAM (Quadrature Amplitude Modulation) signal. An ordinal 4 phase PSK (Phase Shift Keying) modulation system is a kind of QAM system. The configuration of the quadrature amplitude modulation system is shown, for example, in FIG. 8 of the U.S. Pat. No. 3,806,807.

Demodulation of a QAM signal at the receiver, or receiving side of this system, is performed by regenerating the carrier and synchronously detecting the received QAM signal with the regenerated carrier.

In this operation, if the phase of the regenerated carrier is not determined and/or varies, these result errors in the demodulated data. The circumstance that the phase of the regenerated carrier is not determined properly is generally referred to as the phase ambiguity of the regenerated carrier.

In ordinal 4-phase PSK systems, differential phase modulation techniques and systems are known which assure correct demodulation in spite of phase ambiguity of the regenerated carrier; in such demodulation, code processings are performed by the differential logic circuit. However, in partial response modulation systems which perform quadrature amplitude modulation by the digital signal (a 3-level signal) which has been subjected to partial response conversion in accordance with techniques related to the present invention (and as later described herein, the transmitted QAM signal has a total of nine phase conditions), techniques for insuring proper demodulation in spite of phase ambiguity of the regenerated carrier at the receiver are currently not known.

SUMMARY OF THE INVENTION

Accordingly, it is an object of the present invention to overcome these defects and ineffeciencies of the prior art and particularly to afford a system which can demodulate correctly, in spite of the phase ambiguity of a regenerated carrier at the receiver, during demodulation. The invention particularly provides for proper demodulation in spite of phase ambiguity of 90° in such a partial response modulation system and wherein the carriers having a phase difference of 90° therebetween as employed in a quadrature amplitude modulation system as above mentioned are independently amplitude modulated by the partial response conversion output signal and the amplitude modulated carrier signals then are combined for transmission.

In accordance with the present invention, two parallel input signals supplied for transmission are processed by a differential logic circuit which produces two parallel output signals, in turn supplied to respective pre-coding circuits and subsequently to corresponding partial response converter circuits. Corresponding modulators receive the thus processed two parallel signals for amplitude modulation of respective quadrature-related carrier signals and for combining same for QAM transmission. The differential logic circuit examines the parallel input signals and, for a code combination thereof wherein the code combination would not be influenced by the 90° phase ambiguity of the regenerated carrier during demodulation in the receiver, the parallel input signals received thereby are applied directly to the pre-coding circuits; conversely, where the code combination of the parallel input signal code combination would be influenced by the 90° phase ambiguity of the regenerated carrier during the aforesaid demodulation, the two parallel input signals are processed in accordance with the differential logic processing prior to supply to the pre-coding circuit. Particularly, when the input signals $P_n$, $Q_n$ are (1,1) or (0,0), they are applied directly to the pre-coding circuit; when (0.1) the preceding transmitting vector position is maintained; and when (1,0), the differential logic changes the phase thereof by ±90° from the preceding transmitting vector position. The preceding transmitting vector is defined as the vector corresponding to the next preceding signal code combination (1,0) or (0,1), skipping any vector corresponding to a code combination (0,0) or (1,1) which may intervene. In the receiver, a corresponding differential logic circuit is provided, whereby the output data in the receiver is accurately reproduced in accordance with the originally transmitted data, independently of the phase ambiguity of the phase of the regenerated carrier in the receiver.

BRIEF DESCRIPTION OF THE DRAWINGS

FIGS. 1(a) and (b) comprise waveforms illustrating the code conversion effected in a class 1 partial response system;

DETAILED DESCRIPTION OF PREFERRED EMBODIMENT

Figure 1:
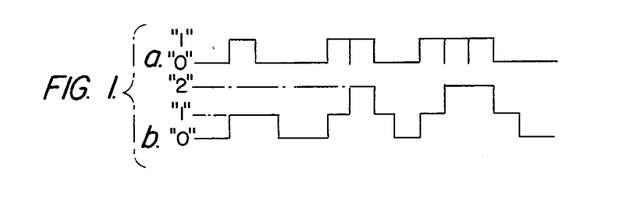

The waveforms of FIG. 1 illustrate the mode of code conversion performed by class 1 partial response systems. The 2-level input digital signal of the waveform of FIG. 1(a) has the levels "0" and "1" and is converted into a 3-level signal as shown in the waveform of FIG. 1(b) by converting the pulse width of the signals of waveform (a) to a doubled width and as a result preceding and succeeding pulses are superposed. In order to demodulate a signal which has been subjected to such partial response conversion and thus to return to the initial 2-level signal, after level detection of the received, partial response converted signal, it is necessary to perform code conversion on that signal on the basis of the mutual relationship of each bit group with the preceding bit groups. Thus, if an error occurs as to a given bit group, that error is generated for succeeding bit groups, a result termed error propagation. Thus, precoding is performed before partial response conversion.

Namely, the code conversion is so performed that the level "1" of three levels of "0", "1" and "2" shown in the waveform of FIG. 1(b) always corresponds to only the level "1" of the two levels of "0" and "1" of the waveform of FIG. 1(b).

Figure 2:
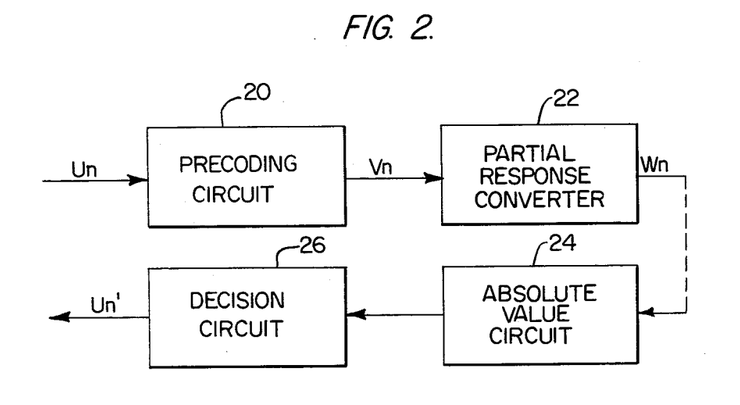
FIG. 2 is a general block diagram of a transmitting-/receiving system wherein an input signal is subject to partial response conversion after precoding.

FIG. 2 is a block diagram of a transmitting system where the input signal is subject to the partial response conversion after the precoding.

At the precoding circuit 20, the input signal $U_n$ is subject to the code conversion according to the logic function:

$$V_n = U_n \oplus V_{n-1} \tag{1}$$

Thus, $V_n$ is output by circuit 20. Here, the symbol $\oplus$ means exclusive logic sum, or exclusive OR processing.

The output of the precoding circuit 20 is subject to the conversion of:

$$W_n = V_n + V_{n-1} \tag{2}$$

at the partial response converter 22. In other words, the pulse width is doubled according to the class 1 partial response conversion and then the preceding and succeeding pulses are superposed. Thus, such pulse conversion results in a 3-level signal. The output $W_n$ of the partial response converter after further processing, including transmission, is thereafter processed by the absolute value circuit 24 and decision circuit 26 of the receiver to generate the signal $U_n'$ which is the same signal as the input signal $U_n$ at the transmitter.

FIGS. 3(a) to 3(d) show the signals at corresponding points of the circuit in FIG. 2. In other words, the signal shown in FIG. 3(a) is applied to the precoding circuit 20 as the input signal $U_n$. Then exclusive logical sum ($\oplus$) is taken between the preceding signal $V_{n-1}$ of the converter output signal $V_n$. Thus, the signal shown on FIG. 3(b) is obtained as the conversion output signal $V_n$ of the precoding circuit 20.

At the partial response converter 22, as explained in FIG. 1, pulses are superposed as a result of converting the 1 bit pulse width into a doubled width and therefore the signal shown in FIG. 3(c) is obtained as the output signal $W_n$. This output signal $W_n$ has three levels (0, 1, 2 or −1, 0, +1) and is transmitted to the receiver.

In case the three levels are 0, 1, 2, the level conversion of three levels (−1, 0, +1) is performed, considering level 1 as 0, and then the absolute value is detected at the absolute value circuit 24. This is a kind of full wave rectification. The output signal is shown in FIG. 3(d). This signal further is inverted at the decision circuit 26. Thereby, the input signal $U_n$ of the transmitter is regenerated again at the receiver.

Figure 4:
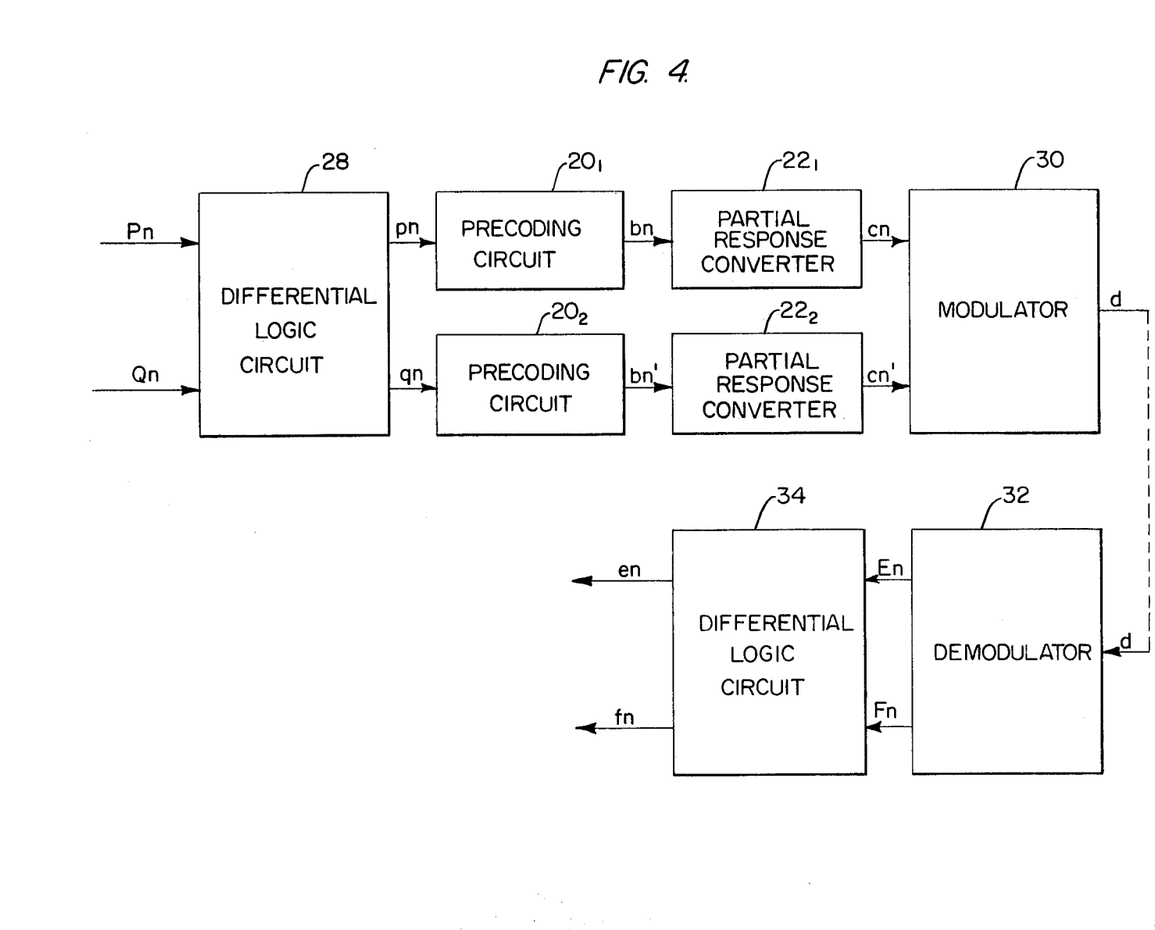
FIG. 4 comprises a general block diagram of an embodiment of the partial response modulation system of the present invention.

The present invention is based on forming a communication system through the combination of a partial response system and the well known, quadrature amplitude modulation system. A block diagram of an embodiment of the present invention is shown in FIG. 4.

In the present invention, the 90° phase-separated carriers are individually amplitude modulated by the respective signals, following the partial response conversion. Thus, the input signals are input as the two parallel digital signals $P_n$ and $Q_n$.

Figure 3:
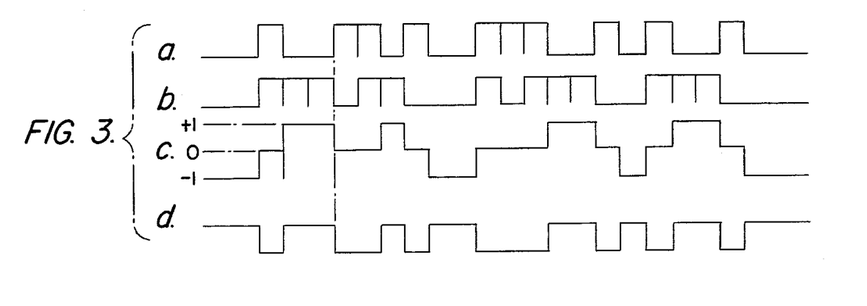
FIGS. 3(a) to 3(d) comprise waveforms illustrating the signals at each stage of the system of FIG. 2.

The two parallel signals $P_n$ and $Q_n$ are supplied to the differential logic circuit 28, which comprises a significant feature of the present invention, and which performs differential logic processing thereof in accordance with the present invention. The outputs $p_n$, $q_n$ of the differential logic circuit 28 are precoded by the precoding circuits $20_1$ and $20_2$ respectively as explained in FIGS. 2 and 3 and thereby $b_n$ and $b_n'$ are output. Namely, logic conversions of:

$$b_n = p_n \oplus b_{n-1}, \text{ and} \quad (3)$$

$$b_n' = q_n \oplus b_{n-1}' \quad (4)$$

are performed. The outputs $b_n'$, $b_n'$ of the precoding circuits $20_1$ and $20_2$ are subject to the partial response conversion at the partial response converters $22_1$ and $22_2$ as explained in FIG. 2 and FIG. 3, and $c_n$, $c_n'$ are output. Namely, conversions of:

$$c_n = b_n + b_{n-1} \quad (5)$$

$$c_n' = b'_n + b'_{n-1} \quad (6)$$

are performed. The outputs $c_n$ and $c_n'$ of the partial response converters $22_1$ and $22_2$ are applied to the modulator 30, where quadrature amplitude modulation is performed. The QAM signal $d$ obtained after the quadrature amplitude modulation at the modulator then is transmitted.

The QAM signal $d$ is received and then applied to the demodulator 32, thus demodulated outputs $E_n$ and $F_n$ are obtained. The demodulated signals $E_n$ and $F_n$ are applied to the differential logic circuit 34. Signals $e_n$ and $f_n$ then are output by the differential logic processing of the present invention. The signals $e_n$ and $f_n$ are exactly the same as the input signals $P_n$ and $Q_n$ is the transmitter.

Figure 5:
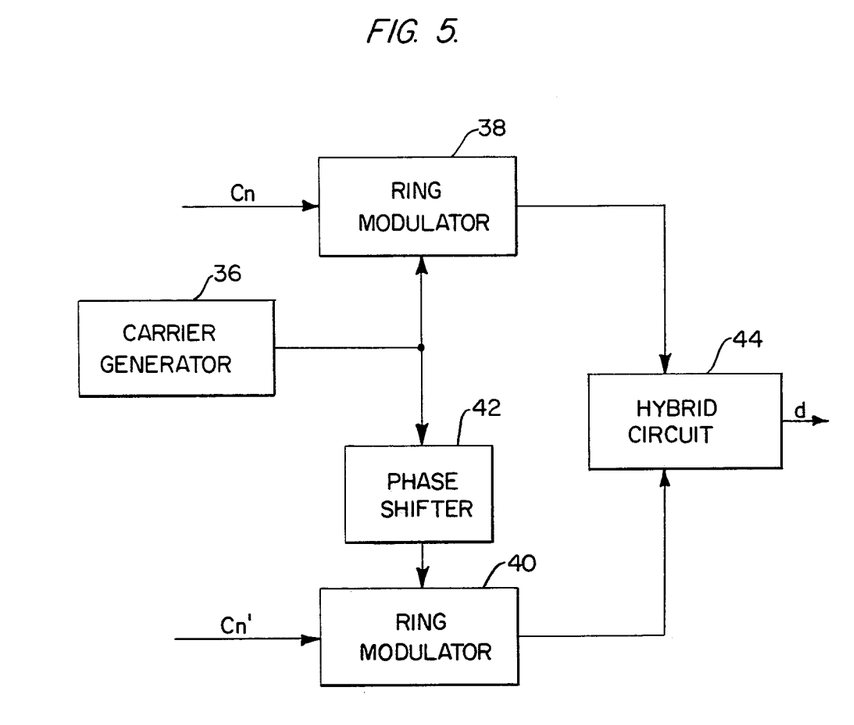
FIG. 5 comprises a block diagram of the modulator in FIG. 4.

The modulator 30 has the configuration, for example, as shown in FIG. 5. The carrier from the carrier generator 36 is directly applied as is the signal $C_n$ to a first ring modulator 38 and via the $\pi/2$ phase shifter 42 as is the signal $c_n'$ to the other ring modulator 40. Thus, the carrier is modulated by the outputs $c_n$, $c_n'$ from the partial response converters $22_1$ and $22_2$ at the rign modulators 38 and 42, respectively. At this time, since the outputs of the partial response converters $22_1$ and $22_2$ take the three levels of "0", "1" and "2" as shown in FIG. 3(c), the quadrature amplitude modulation is carried out on the correspondence, for example, between "0" level and $+eV$, "1" level and OV, "2" level and $-eV$.

Figure 6:
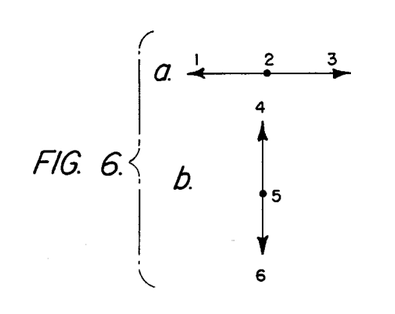
FIGS. 6(a), 6(b) and 7 comprise vector plots for explaining the operation of the modulation 30 of FIG. 5.

Therefore, the output vectors of the ring modulators 38, 40 take respectively three states, or vector values of 1 to 3 and 4 to 6 as indicated in FIGS. 6(a) and (b) for the in-phase and quadrature channels respectively. As a result, the output $d$ of the hybrid circuit 44 comprises nine vector values, or states of 1 to 9 as shown in FIG. 7 as the QAM signal.

Figure 8:
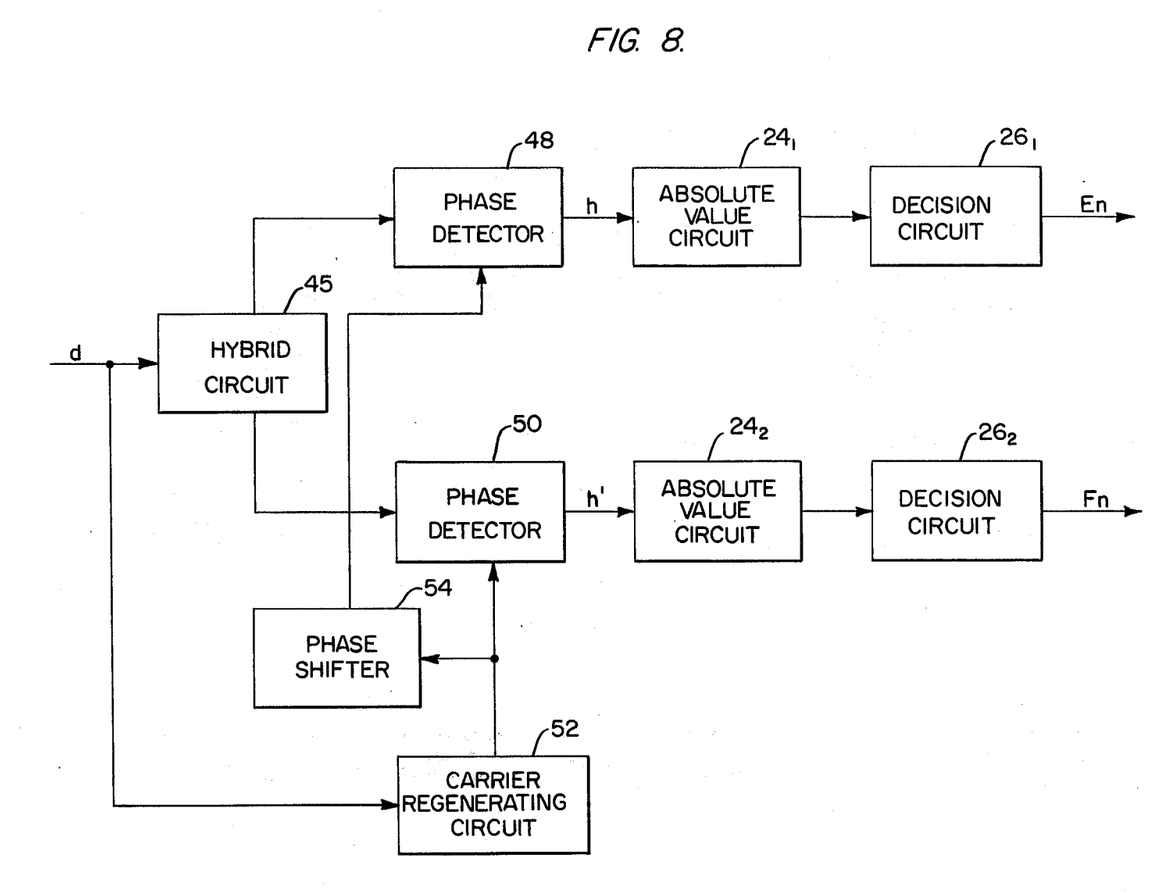
FIG. 8 comprises a block diagram of the demodulator of FIG. 4.

The demodulator 32 has the configuration, for example, as shown in FIG. 8. The received QAM signal $d$ is branched by the hybrid circuit 46 and then applied to the phase detectors 48 and 50. Also, the QAM signal $d$ is applied to the carrier regenerating circuit 52, wherein the carrier is regenerated. The carrier is directly applied to the one phase detector 48 and via the $\pi/2$ phase shifter 54 to the other phase detector 50.

The phase detectors 48 and 50 performs synchronous detection and produce the baseband signals $h$, $h'$ as their outputs. These baseband signals $h$, $h'$ are 3-level signals such as the signals $c_n$ and $c_n'$ of the transmitter. This configuration is the same as that in a PSK system. Since these baseband signals are, respectively, individual partial response signals, the demodulated outputs $E_n$ and $F_n$ are obtained by means of the respective absolute value circuits $24_1$, $24_2$, and decision circuits $26_1$ and $26_2$, as explained in FIG. 2. In such a synchronous detection system, it is necessary to know, in advance, the phase of the regenerated carrier in order to obtain the correct demodulated output.

Figure 7:
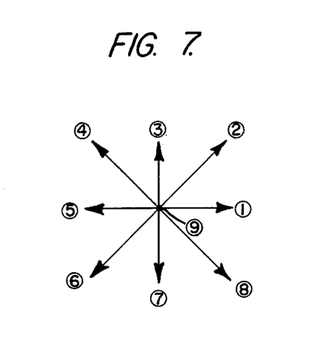

If it is assumed that the phase of regenerated carrier during demodulation is that of the vectors 3 and 1 in FIG. 7, the demodulated outputs $E_n$ and $F_n$ which are obtained in correspondence to each vector 1 to 9 in FIG. 7 are those as shown in Table 1. The demodulated signals $E_n$ and $F_n$ become "0" when the phase of the received QAM signal includes the same phase as that of the regenerated carrier, or "1" when it does not include such phase component.

Table 1

| Vector position | $E_n$ | $F_n$ |
|---|---|---|
| 1 or 5 | 0 | 1 |
| 3 or 7 | 1 | 0 |
| 2, 4, 6, 8 | 0 | 0 |
| 9 | 1 | 1 |

In above Table 1, the phase of the regenerated carrier is assumed to be that of the vectors 3 and 1 in FIG. 7. However, the phase of the regenerated carrier is not determined precisely in a conventional, or ordinary, carrier regeneration circuit. Namely, in general, the conventional carrier regeneration circuit comprises a phase lock loop and when a QAM signal having the phase vector diagram as shown in FIG. 7 is input, there exists a total of eight stable points of phase lock, phase displaced in accordance with the eight vector positions from 1 to 8 in FIG. 7, with phase displaced intervals of 45°. In this case, the phase lock loop does not become stable at any position other than the said vector positions from 1 to 8. Therefore, the phase lock loop is driven to one of these stable points from 1 to 8.

The phase of the carrier regenerated in such a carrier regeneration circuit differs for each receiving start time of the QAM signal; moreover, the phase of the regenerated carrier varies due to thermal noises on the transmission line, even during continuous receiving. (In this case also, any one of the positions 1 to 8 in FIG. 7 may be taken). Since the phase of the regenerated carrier is not determined as to any specific one of the 1 to 8 (with 45° spacing) vectors as mentioned above, the demodulated output signals $E_n$ and $F_n$ are not also determined. (For example, if the phase of regenerated carrier is applied to the phase detectors 48 and 50 in accordance with the vector 4 and 2, or the vector 5 and 3 in FIG. 7, the demodulated signals $E_n$ and $F_n$ obtained in correspondence to vectors 1 to 9 in FIG. 7 will differ from those in Table 1.) Therefore, regenerated carriers have the phase ambiguity of 45° (±45°), 90° (±90°).

The present invention provides a partial response modulation system which is not influenced by the phase ambiguity of the regenerated carrier, particularly by the phase ambiguity of 90°. In the present invention, as explained in detail below, only the phase ambiguity of 90° is considered as the problem.

In the case that the phase ambiguity of the regenerated carrier is 90°, it is not determined whether the phase of the regenerated carrier takes the same phase as any specific one of the vectors, 1, 3, 5 and 7 in FIG. 7. When the vector of the received QAM signal corresponds to any of the phase vectors 2, 4, 6 or 8 in FIG. 7, the demodulated data (demodulated output signals, $E_n$, $F_n$) is always (0,0) irrespective of the phase ambiguity of 90° of the regenerated carrier; when the vector is 9, the demodulated data is always (1,1). However, when the received vector is 1,5 the demodulated data is (1,0) or (0,1) according to the 90° difference of the regenerated carrier phase. This is the same when the received vector is 3,7. Therefore, the phase ambiguity of 90° becomes a problem.

In the present invention, and from the abovementioned relation, the following transmitting logic is employed; where when the input signals $P_n$, $Q_n$ are (1,1) and (0,0) they are applied directly to the precoding circuits $20_1$ and $20_2$; when (0,1), the preceding transmitting vector position is maintained; and when (1,0), the differential logic changes the phase by 90° (±90°) from the preceding transmitting vector position and then the input signal (1,0) is applied to the precoding circuits $20_1$ and $20_2$. The aforementioned "preceding transmitting vector" moreover is defined to be that previous vector (i.e., it is found by retracing up to the vector) corresponding to the next preceding (1,0) or (0,1) or (1,1) signals which may exist just before (i.e., prior to) the relevant transmitting vector.

In the receiver, the following receiving logic, adopting the following differential logic, is employed: if the input signals (demodulated signals) $E_n$ and $F_n$ are (1,1) or (0,0), they are directly output; and if (0,1) or (1,0), they are compared with the combination, $E_{n-1}$, $F_{n-1}$ corresponding to the preceding received signal vector. Then, if the result is the same, (0,1) is output, while if different, (1,0) is output.

In this case also, the "preceding receiving vector" shall be defined as (and, thus, found by retracing up to) the vector corresponding to the next preceding (1,0) or (0,1) signals, skipping any intervening vector corresponding to (0,0) or (1,1), signals which may exist are found just before (i.e., prior to) the relevant receiving vector.

The truth tables of these transmitting and receiving logic functions are shown in Table 2 and Table 3, respectively.

TABLE 2

| $p_{n-1}$ | $q_{n-1}$ | $P_n$ | $Q_n$ | $p_n$ | $q_n$ | VECTORS |
|---|---|---|---|---|---|---|
| X | X | 0 | 0 | 0 | 0 | ②, ④, ⑥, ⑧ |
| X | X | 1 | 1 | 1 | 1 | ⑨ |
| 0 | 1 | 0 | 1 | 0 | 1 | ①, ⑤ |
| 0 | 1 | 1 | 0 | 1 | 0 | ①, ⑤→③, ⑦ |
| 1 | 0 | 0 | 1 | 1 | 0 | ③, ⑦ |
| 1 | 0 | 1 | 0 | 0 | 1 | ③, ⑦→①, ⑤ |

TABLE 3

| $E_{n-1}$ | $F_{n-1}$ | $E_n$ | $F_n$ | $e_n$ | $f_n$ |
|---|---|---|---|---|---|
| X | X | 0 | 0 | 0 | 0 |
| X | X | 1 | 1 | 1 | 1 |
| 0 | 1 | 1 | 0 | 1 | 0 |
| 0 | 1 | 0 | 1 | 0 | 1 |
| 1 | 0 | 1 | 0 | 0 | 1 |
| 1 | 0 | 0 | 1 | 1 | 0 |

To explain the transmitting logic of Table 2, when the input signals $P_n$ and $Q_n$ are (0,0) or (1,1), $P_n$ and $Q_n$ are directly output as $p_n$, $q_n$; or when (0,1), $p_{n-1}$, $q_{n-1}$ corresponding to the preceding transmitting vector (for (0,1) or (1,0) only) are output as $p_n$, $q_n$; and when (1,0), $\bar{p}_{n-1}$ and $\bar{q}_{n-1}$ which are obtained by inverting $p_{n-1}$, $q_{n-1}$ corresponding to the preceding transmitting vector (for (0,1) or (1,0) are output as $p_n$ and $q_n$.

Similarly, in the receiving logic in Table 3, when the input signals $E_n$, $F_n$ are (0,1) or (1,1) $E_n$ and $F_n$ are directly outputs as $e_n$ and $f_n$. When (0,1) or (1,0), the input signals are compared with $E_{n-1}$, $F_{n-1}$ corresponding to the preceding receiving vector (for, (0,1) or (1,0) only); then, if the result is the same, $(e_n, f_n)$ are output as (0,1) and if the result is different (inverse), $(e_n, f_n)$ are output as (1,0), respectively.

In Table 3, when $E_n$, $F_n$ are (0,1) or (1,0), the outputs $e_n$, $f_n$ are determined by the differential logic between $E_n$, $F_n$ and $E_{n-1}$, $F_{n-1}$. Therefore, if $E_{n-1}$ and $F_{n-1}$ are inverted by the phase ambiguity of 90° by mistake, $E_n$ and $F_n$ are also inverted, and thus $e_n$ and $f_n$ are correct.

When $P_n \oplus Q_n = 1$, the logic equations of the transmitting logic become:

$$p_n = p_{n-1} \cdot \bar{q}_{n-1} \cdot \bar{P}_n \cdot Q_n + \bar{p}_{n-1} \cdot q_{n-1} \cdot P_n \cdot \bar{Q}_n \tag{7}$$

$$q_n = p_{n-1} \cdot \bar{q}_{n-1} \cdot P_n \cdot \bar{Q}_n + \bar{p}_{n-1} \cdot q_{n-1} \cdot \bar{P}_n \cdot Q_n \tag{8}$$

Where, $p_{n-1}$ and $q_{n-1}$ may be any bit code combination, except for (1,1) and (0,0) which next precedes $p_n$, $q_n$ and the vector of which is considered as the "preceding vector".

When $E_n \oplus F_n = 1$, the logic equations of the receiving logic become:

$$e_n = E_n \cdot F_{n-1} \cdot \bar{E}_{n-1} \cdot \bar{F}_n + E_{n-1} \cdot \bar{F}_{n-1} \cdot \bar{E}_n \cdot F_n \tag{9}$$

$$f_n = E_{n-1} \cdot \bar{F}_{n-1} \cdot E_n \bar{F}_n + \bar{E}_{n-1} \cdot F_{n-1} \cdot \bar{E}_n \cdot F_n \tag{10}$$

Where, the phase ambiguity of the carrier is 90° and any of the vectors 1, 3, 5, 7 as shown in FIG. 7 is taken as the carrier phase.

Figure 9:
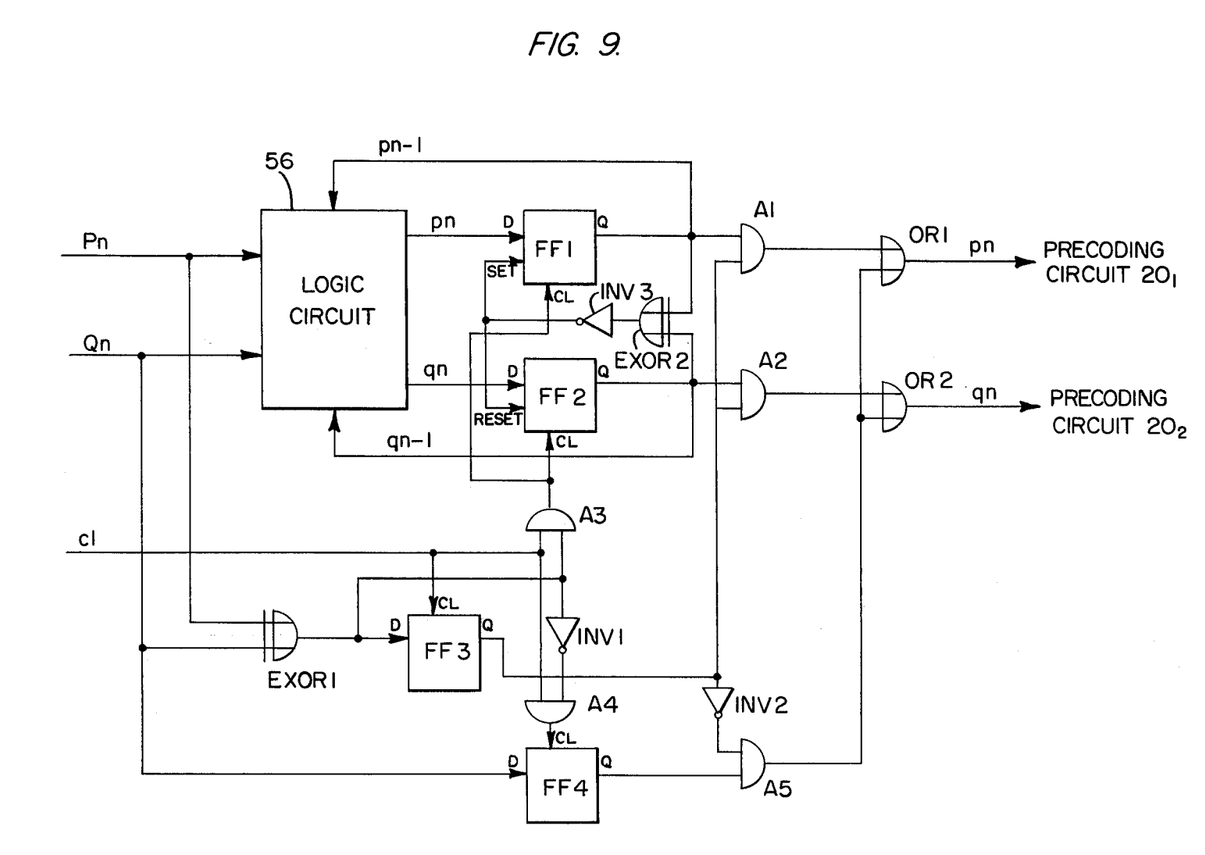
FIG. 9 comprises a block diagram of the differential logic circuit 28 of the transmitter of FIG. 4.

FIG. 9 is a block diagram of the differential logic circuit 28 of the transmitter. Input signals $P_n$ and $Q_n$ are applied to the logic circuit 56, which has a logic configuration for executing the logical operations expressed by equations (7) and (8) set forth above. In an initial condition, the flip-flop FF1 is set, while the flip-flops FF2 to FF4 are reset. A1 to A5 are AND circuits; OR 1 to OR 2 are OR circuits; INV1 to INV3 are inverters; EXOR 1 to EXOR 2 are exclusive OR circuits; cl is a clock signal.

When the pair of input signals $P_n$ and $Q_n$ is (0,0) or (1,1), the output of the exclusive OR circuit EXOR 1 is "0". Therefore, the clock cl is applied to the flip flop circuit FF4 via the AND circuit and the output of flip-flop FF4 is applied to the precoding circuits $20_1$ and $20_2$ via the AND circuit A5 and the OR circuits OR1 and OR2.

When the pair of input signals $P_n$ and $Q_n$ is (1,0) or (0,1), the output of the exclusive OR circuit EXOR 1 becomes "1", and the clock cl is applied to the flip-flop circuits FF1 and FF2 via the AND circuit A3. Thus, these flip-flops are set according to the outputs $p_n$ and $q_n$ which have been obtained by the logical processings of equations (7) and (8) performed by the logic circuit 56. When the flip-flop FF3 is set by the clock cl, the outputs of the flip-flops FF1 and FF2 are respectively applied to the precoding circuits $20_1$ and $20_2$ via the AND circuits $A_1$ and $A_2$ and OR circuits $OR_1$ and $OR_2$.

The flip-flop circuits FF1 and FF2 are provided for storing the output signals $p_n$ and $q_n$ of values (1,0) or (0,1); the exclusive OR circuit EXOR 1 supplies the input signals $P_n$ and $Q_n$ directly to the precoding circuits $20_1$ and $20_2$ when they are (0,0) or (1,1) and keeps the conditions of flip-flop circuits FF1 and FF2 unchanged. Therefore, the input signals can be transmitted through modulation by means of the differential logic on the basis of the relation of preceding phase status, so long as the input signals $P_n$ and $Q_n$ are (1,0) or (0,1).

The outputs of the flip-flop circuits FF1 and FF2 are respectively applied to the SET and RESET terminals of the FF1 and FF2 via the exclusive OR circuit EXOR 2 and inverter INV 3. This arrangement is provided for the following reason. The flip-flop circuits FF1 and FF2 are forced to respective set and reset conditions (1,0) for the purpose of preventing erroneous operation of the differential logic circuit, such as may occur when, or if, the flip-flop circuits FF1 and FF2 operate erroneously, for example, by thermal noise, producing a combination output (0,0) or (1,1).

Figure 10:
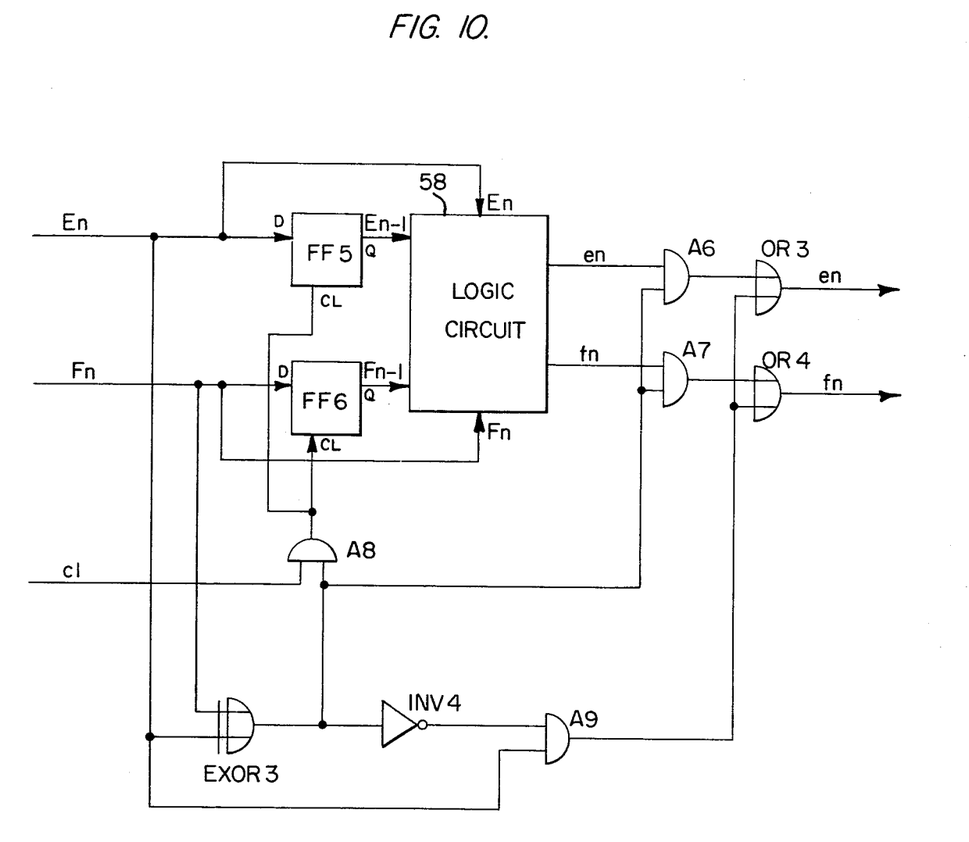
FIG. 10 comprises a block diagram of the differential logic circuit 34 of the receiver, or receiving side, of the system of the invention as shown in FIG. 4.

FIG. 10 shows the block diagram of the differential logic circuit 34 of the receiver. The input signals $E_n$ and $F_n$ are supplied to both logic circuit 58 and flip-flop circuits FF5 and FF6, respectively.

The logic circuit 58 performs the logical operations expressed by the equations (9) and (10) mentioned above, on the output signals $E_{n-1}$, $F_{n-1}$ of the flip-flop circuits FF5 and FF6 and the inputs signals $E_n$, $F_n$. A6 to A9 are AND circuits; OR3, OR4 are OR circuits; INV 4 is an inverter; EXOR 3 is an exclusive OR circuit; and cl is the clock.

When the pair of the input signals $E_n$, $F_n$ is (0,0) or (1,1), the output of exclusive OR circuit EXOR 3 is "0". Therefore, the input signals are directly output via the AND circuit A9 and OR circuit OR3.

When the pair of input signals $E_n$ and $F_n$ are (1,0) or (0,1), the output of exclusive OR circuit EXOR 3 becomes "1" and the clock cl is applied to the flip-flop circuits FF5 and FF6 via the AND circuit A8; thus, they are set according to the input signal. The outputs $e_n$, $f_n$ of the logic circuit 58 performing the logical processing of equations (9) and (10) are supplied via the AND circuits A6, A7, and OR circuits OR3 and OR4.

The flip-flop circuits FF5, FF6 are provided for storing the input signals $E_n$, $F_n$ of (1,0) or (0,1), and the exclusive OR circuit EXOR 3 directly outputs the input signal $E_n$, $F_n$ when they are (0,0) or (1,1) and keeps the condition of FF5 unchanged.

Figure 11:
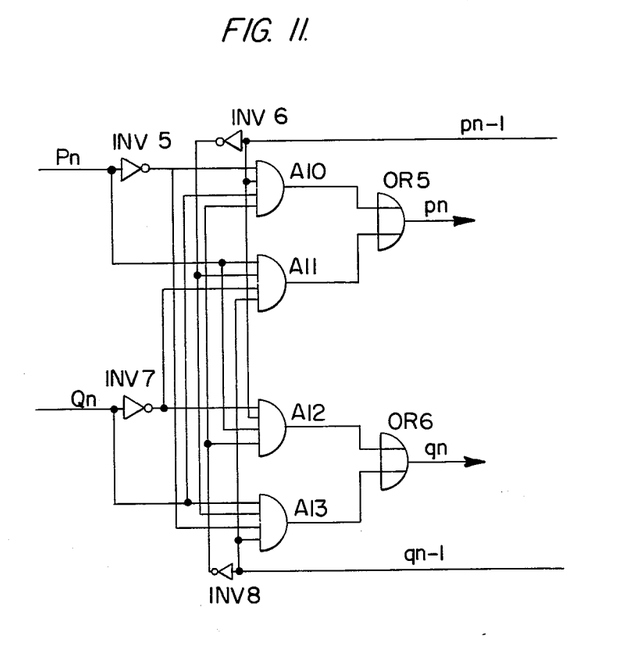
FIG. 11 comprises a logic circuit schematic of the logic circuit 56 of FIG. 9.

FIG. 11 shows the schematic diagram of the logic circuit 56 in FIG. 9. A10 to A13 are AND circuits; OR 5 and OR 6 are OR circuits; and INV 5 to INV 8 are inverters.

Figure 12:
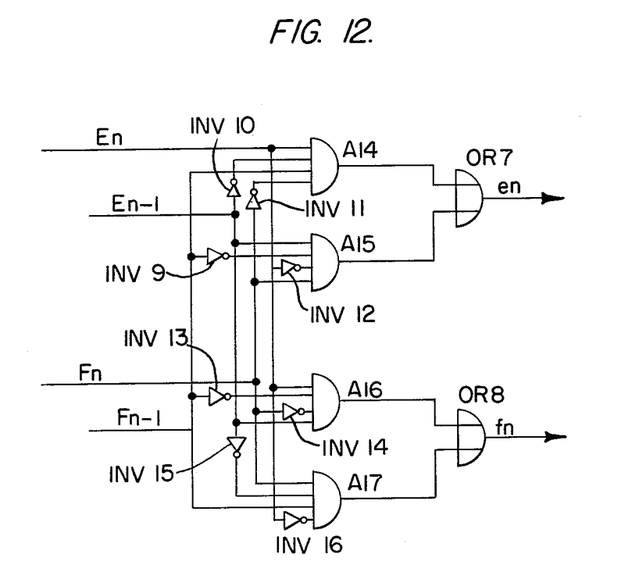
FIG. 12 comprises a logic circuit schematic of the logic circuit 58 of FIG. 10.

FIG. 12 shows the schematic diagram of the logic circuit 58 in FIG. 10. A14 to A18 are AND circuits; OR7 and OR8 are OR circuits; and INV 10 to INV 16 are inverters.

Figure 13:
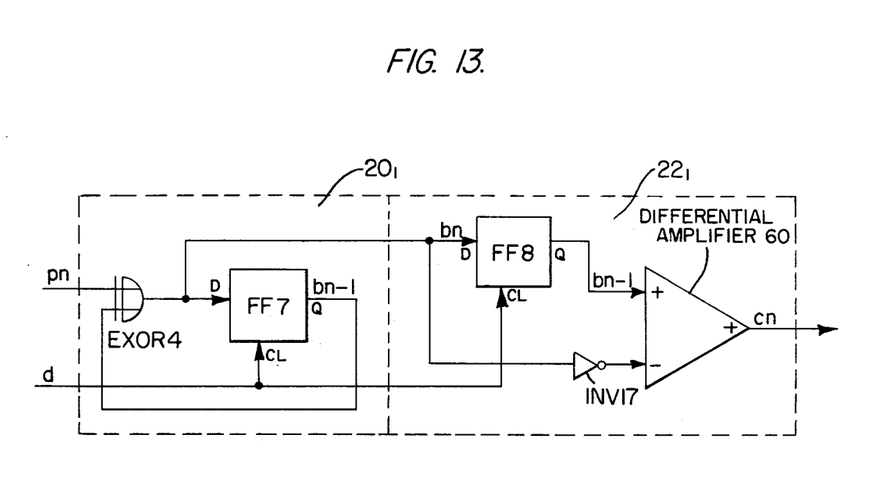
FIG. 13 comprises a logic circuit schematic of the precoding circuit 20 and the partial response converter 22 of the block diagram of FIG. 4.

FIG. 13 shows the circuit configuration of the pre-coding circuit $20_1$ and the partial response converter $22_1$. The configuration of the precoding circuit $20_2$ and the partial response converter $22_2$ in FIG. 4 is exactly the same as this configuration.

In FIG. 13, the exclusive OR circuit EXOR 4 and flip-flop circuit FF7 form the pre-coding circuit $20_1$, which outputs bn by executing logic convertion of $b_n = P_n \oplus b_{n-1}$ for the input signal $P_n$.

The flip-flop FF8, inverter INV 17, and differential amplifier 60 form the class 1 partial response converter $22_1$. This circuit executes the conversion of $cn - bn + bn - 1$ and provides an output cn.

The input signal $b_n$ is inverted by the inverter INV 17 and supplied to the negative terminal of the differential amplifier as the signal $\bar{b}_n$.

Figure 14:
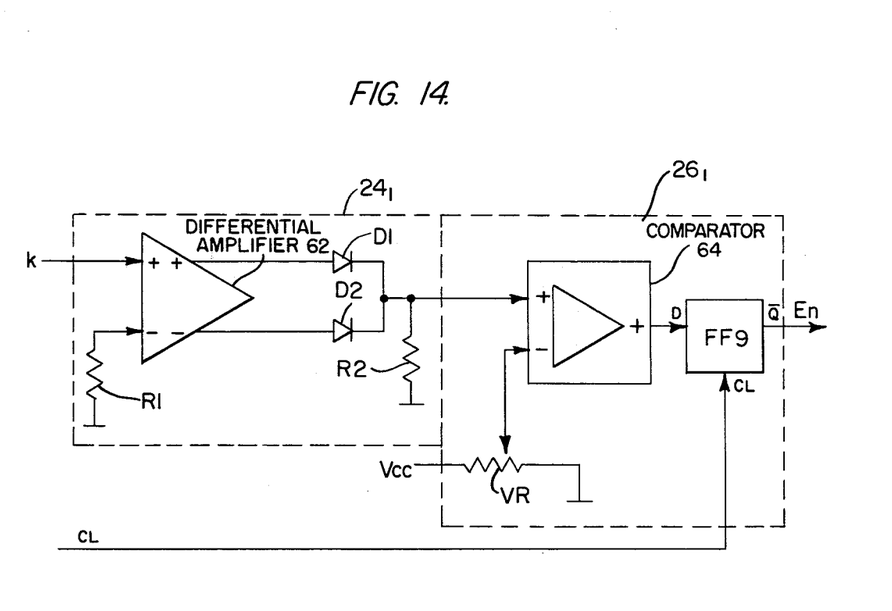
FIG. 14 comprises a logic circuit schematic of the absolute value detector 24 and the decision circuit 26 as shown generally in FIG. 2 and in more detail in FIG. 8.

FIG. 15 shows the circuit configuration of the absolute value circuit $21_1$ and the decision circuit $26_1$ in FIG. 8. The configuration of the absolute value circuit $24_2$ and the decision circuit $26_2$ in FIG. 8 is exactly the same as this circuit configuration.

In FIG. 14, differential amplifier 62, diodes D1, D2 and resistors R1, R2 form the absolute value circuit $24_1$ and this circuit full wave rectifies the input baseband signal h. The resistor R1 is the input resistor and resistor R2 is the load resistor. The output of the absolute value circuit $24_1$ is applied to the decision circuit $26_1$ consisting of a comparator 64, a variable resistor VR and a flip-flop FF9. The decision circuits $26_1$, and $26_2$ detect the input level and output $E_n$ after signal inversion. The flip-flop circuit FF9 is capable of converting the output level of comparator $26_1$ to the logic level and inverting. Vcc indicates the power source voltage.

As explained above, in the present invention, partial response conversion is carried out after precoding the two series of input signals and then quadrature amplitude modulation is performed with these two series of partial response converted output signals. Moreover, when the combination of the two series of input signals is (0,0) or (1,1), and which therefore can be demodulated without being influenced or affected by the phase ambiguity of 90°. of the regenerated carrier, the input signals are directly applied to the precoding circuit. When the demodulation is influenced by the phase ambiguity of 90° of the regenerated carrier, such as for the combination of input signals (1,0) or (0,1), the two parallel input signals are applied to the precoding circuit after completing the differential logic processing; therefore, demodulation can be performed without being influenced, or affected, by the phase ambiguity of 90° of the regenerated carrier.

In addition, since partial response conversion is carried out, transmission bandwidth can be narrowed as compared with an ordinary 4-phase SK system, thus realizing economical data transmission system.

The present invention can be adopted not only to the class 1 partial response system but also to other systems, such as a class 4 partial response system, which can convert the input signal levels to three levels.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. In a partial response modulation system having a receiver portion including a means for regenerating a carrier which is subject to phase ambiguity, and comprising in the transmitter portion thereof two pre-coding circuits for respectively precoding two parallel input signals and producing corresponding pre-coded output signals, two partial response converters for performing partial response conversion of the respective outputs of the said two pre-coding circuits and a modulator for amplitude modulating quadrature-related carriers of a common frequency with said two partial response converter outputs and producing a quadrature amplitude modulated output, the improvement comprising:

processing means, including a differential logic circuit and means for receiving said two parallel input signals and detecting when the combination code of said two parallel input signals is such as not to be influenced by the 90° phase ambiguity of the regenerated carrier during demodulation in a receiving means, thereupon to apply said two parallel input signals directly to said respective two pre-coding circuits, and for detecting when the combination of said two parallel input signals codes is such as will be influenced by the 90° phase ambiguity of the said regenerated carrier during demodulation, thereupon to apply said two parallel input signals to said differential logic processing means prior to processing of said two parallel input signals by said respective two pre-coding circuits.

2. A partial response system as recited in claim 1, wherein said partial response converter is a class 1 partial response converter, and converts a 2-level signal to a signal having doubled pulse width and then converts said doubled pulse width 1-level signal to a 3-level signal by superpositioning, in time, of preceding and succeeding pulses.

3. A partial response modulation system as recited in claim 2, wherein said differential logic circuit outputs $p_n$, $q_n$, satisfy the following relations:

$$p_n = p_{n-1} \cdot \overline{q_{n-1}} \cdot \overline{P_n} \cdot Q_n + \overline{p_{n-1}} \cdot q_{n-1} \cdot P_n \cdot \overline{Q_n}$$

$$q_n = p_{n-1} \cdot \overline{q_{n-1}} \cdot P_n \cdot \overline{Q_n} + \overline{p_{n-1}} \cdot q_{n-1} \cdot \overline{P_n} \cdot Q_n$$

where said two series of input signals are $P_n$, $Q_n$ having the code combination:

$$P_n \oplus Q_n = 1$$

(where, $p_{n-1}$, $Q_{n-1}$ is any combination code, excepting the combination codes (1,1) and (0,0), next preceding the code combination $p_n$ and $q_n$), and $p_n$ and $q_n$ satisfy the relation:

$$p_n = P_n$$

$$q_n = Q_n$$

when the combination code is given as $P_n \oplus Q_n \neq 1$.

4. A partial response quadrature amplitude modulation system for transmission of digital data and having a receiver portion including means for regenerating a carrier which is subject to phase ambiguity, comprising:
means for supplying digital data to be transmitted as two parallel input serial signals,
differential logic means for receiving said parallel input signals, including
means for evaluating each successive combination code of said two parallel input serial signals for identifying each combination code of said signals which is subject to the 90° phase ambiguity of the regenerated carrier during demodulation of the thus transmitted signal in a receiver and for identifying those code combinations which are not subject as aforesaid to the phase ambituity of said regenerated carrier,
differential logic processing means, and
means responsive to said evaluating means identifying a given code combination subject as aforesaid to said phase ambituity, for supplying said given code combination to said differential logic processing means for processing thereby and producing corresponding processed outputs, and responsive to said evaluating means identifying code combinations not influenced by said phase ambiguity to supply each such latter code combination directly as the outputs of said differential logic circuit means,
pre-coding means for receiving both said directly supplied and said processed outputs of said differential logic processing means and producing parallel precoded output signals,
partial response converter means receiving said parallel precoded output signals and producing parallel partial response converted output signals, and
modulator means for receiving said parallel output signals of said partial response converter means and amplitude modulating corresponding quadrature related carriers therewith and producing a combined, quadrature amplitude modulated output signal.

5. The partial response modulation system as recited in claim 4 wherein said partial response converter means comprises a class 1 partial response converter for each of said precoded parallel signals, each said partial response converter converting a 2-level signal to a signal of doubled pulse width and converting said doubled pulse width 2-level signals to 3-level signals by superpositioning of preceding and succeeding pulses, in time.

6. A partial response modulation system as recited in claim 5, wherein said differential logic circuit outputs $p_n$, $q_n$, which satisfy the following relations:

$$p_n = P_{n-1} \cdot \overline{q_{n-1}} \cdot \overline{P_n} \cdot Q_n + \overline{p_{n-1}} \cdot q_{n-1} \cdot P_n \cdot \overline{Q_n}$$

$$q_n = p_{n-1} \cdot \overline{q_{n-1}} \cdot P_n \cdot \overline{Q_n} + \overline{p_{n-1}} \cdot q_{n-1} \cdot \overline{P_n} \cdot Q_n$$

where said two series of input signals are $P_n$, $Q_n$ having the code combination:

$$P_n \oplus Q_n = 1$$

(where, $p_{n-1}$, $q_{n-1}$ is any combination code, excepting the combination codes (1,1) and (0,0), next preceding the code combination $p_n$ and $q_n$), and $p_n$ and $q_n$ satisfy the relation:

$$p_n = P_n$$

$$q_n = Q_n$$

when the combination code is given as $P_n \oplus Q_n \neq 1$.

* * * * *

UNITED STATES PATENT OFFICE
CERTIFICATE OF CORRECTION

Patent No. 4,055,727    Dated  October 25, 1977

Inventor(s) Tadayoshi Katoh

It is certified that error appears in the above-identified patent and that said Letters Patent are hereby corrected as shown below:

Column 2, line 9, change "these" to --there--.

Column 2, line 68, change "(0.1)" to --(0,1)--.

Column 3, line 31, change "modulation" to --modulator--.

Column 5, line 11, change "$b_n'$, $b_n'$" to --$b_n$, $b_n'$--.

Column 5, line 32, change "is" to --in--.

Column 5, line 39, change "rign" to --ring--.

Column 7, line 61, change "$p_n, q_n$;" to --$p_n$, $q_n$;--.

Column 7, line 63, change "$p_n, q_n$;" to --$p_n$, $q_n$;--.

*Column 7, line 66, after "(1,0)" insert --)--.

Column 7, line 68, change "(0,1)" to --(0,0)--.

UNITED STATES PATENT OFFICE
CERTIFICATE OF CORRECTION

Patent No. 4,055,727    Dated October 25, 1977

Inventor(s) Tadayoshi Katoh

It is certified that error appears in the above-identified patent and that said Letters Patent are hereby corrected as shown below:

Column 9, line 57, change "convertion" to -- conversion --.

Column 10, line 35, change "SK" to -- PSK --.

Column 11, line 14, change "1-level" to -- 2-level --.

Column 11, line 30, change "$p_{n-1}, Q_{n-1}$" to -- $p_{n-1}, q_{n-1}$ --.

Column 12, line 4, change "ambituity" to -- ambiguity --.

Signed and Sealed this

Eleventh Day of July 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,055,727
DATED : October 25, 1977
INVENTOR(S) : Tadayoshi Katoh

It is certified that error appears in the above-identified patent and that said Letters Patent are hereby corrected as shown below:

Column 12, line 37, change

"$P_n = P_{n-1} \cdot \bar{q}_{n-1} \cdot \bar{P}_n \cdot Q_n + \bar{P}_{n-1} \cdot q_{n-1} \cdot P_n \cdot \bar{Q}_n$" to --$P_n = P_{n-1} \cdot \bar{q}_{n-1} \cdot \bar{P}_n \cdot Q_n + \bar{P}_{n-1} \cdot q_{n-1} \cdot P_n \cdot \bar{Q}_n$--.

Signed and Sealed this

Seventeenth Day of October 1978

[SEAL]

Attest:

RUTH C. MASON
Attesting Officer

DONALD W. BANNER
Commissioner of Patents and Trademarks